US00RE46226E

(19) United States
(12) Reissued Patent
Gambino

(10) Patent Number: US RE46,226 E
(45) Date of Reissued Patent: Dec. 6, 2016

(54) WEAPON SIGHTING DEVICE

(71) Applicant: Leupold & Stevens, Inc., Beaverton, OR (US)

(72) Inventor: Joseph Gambino, Beaverton, OR (US)

(73) Assignee: Leupold & Stevens, Inc., Beaverton, OR (US)

(21) Appl. No.: 29/517,477

(22) Filed: Feb. 12, 2015

Related U.S. Patent Documents

Reissue of:
(64) Patent No.: Des. 676,096
Issued: Feb. 12, 2013
Appl. No.: 29/403,121
Filed: Sep. 30, 2011

(51) LOC (10) Cl. ..... 22-01
(52) U.S. Cl.
USPC ..... D22/109
(58) Field of Classification Search
USPC ..... D22/108–110; D16/130, 132, 133, 134, D16/330
CPC ..... F41G 1/48; F41G 1/40; F41G 1/42; F41G 1/44; F41G 1/473
See application file for complete search history.

(56) References Cited

U.S. PATENT DOCUMENTS

| | | | | |
|---|---|---|---|---|
| D349,510 | S * | 8/1994 | Tomita | D16/132 |
| D351,397 | S * | 10/1994 | Dor | D16/130 |
| D365,858 | S * | 1/1996 | Tomita | D22/109 |
| D413,130 | S * | 8/1999 | Bryant et al. | D16/132 |
| D420,718 | S | 2/2000 | Otteman et al. | |
| D427,275 | S * | 6/2000 | Gilmore | D22/109 |
| 6,327,806 | B1 * | 12/2001 | Paige | 42/113 |
| D522,031 | S * | 5/2006 | Siu | D16/132 |
| 7,145,703 | B2 * | 12/2006 | Sieczka et al. | 359/15 |
| 7,225,576 | B2 * | 6/2007 | Ballard | 42/118 |
| D590,970 | S | 4/2009 | Kornfeld et al. | |
| D615,141 | S * | 5/2010 | Leighton et al. | D22/108 |
| 8,087,196 | B2 * | 1/2012 | Jung et al. | 42/113 |
| 8,186,093 | B1 * | 5/2012 | Chung | 42/113 |
| D662,566 | S * | 6/2012 | Estes | D22/109 |

OTHER PUBLICATIONS

Lapham, et al., "Bezel for a Sighting Device", U.S. Appl. No. 29/527,994, filed May 23, 2015.

(Continued)

*Primary Examiner* — Phillip S Hyder
(74) *Attorney, Agent, or Firm* — Stoel Rives LLP; Robert R. Teel

(57) CLAIM

I claim the ornamental design for a weapon sighting device, as shown and described.

DESCRIPTION

FIG. 1 is a front, top, right side isometric view of a weapon sighting device;
FIG. 2 is a left side view of the weapon sighting device of FIG. 1;
FIG. 3 is a top view of the weapon sighting device of FIG. 1;
FIG. 4 is a right side view of the weapon sighting device of FIG. 1;
FIG. 5 is a bottom view of the weapon sighting device of FIG. 1[.];
FIG. 6 is a rear view of the weapon sighting device of FIG. 1; and,
FIG. 7 is a front view of the weapon sighting device of FIG. 1.

1 Claim, 3 Drawing Sheets

Matter enclosed in heavy brackets [ ] appears in the original patent but forms no part of this reissue; matter printed in italics indicates the additions made by reissue.

(Amended)

(56) References Cited

OTHER PUBLICATIONS

Surefire LLC, "2004 Illumination Tools", archived at https://web.archive.org/web/20150827174057/http://home.comcast.net/~rdh10/http/Surefire/Surefire-2004-III.pdf, dated 2004.

Trijicon, Inc., "Trijicon ACOG 4×32 Scope", archived at https://web.archive.org/web/20110913033810/http://www.trijicon.com/na_en/products/product3.php?pid=TA01NSN-RMR, archived Sep. 13, 2011.

Trijicon, Inc, Trijicon ACOG®, www.trijicon.com/na_en/products/product3.php?pid+TA01NSN-RMR, sold at least one year prior to filing date (at least as early as Sep. 2010).

* cited by examiner

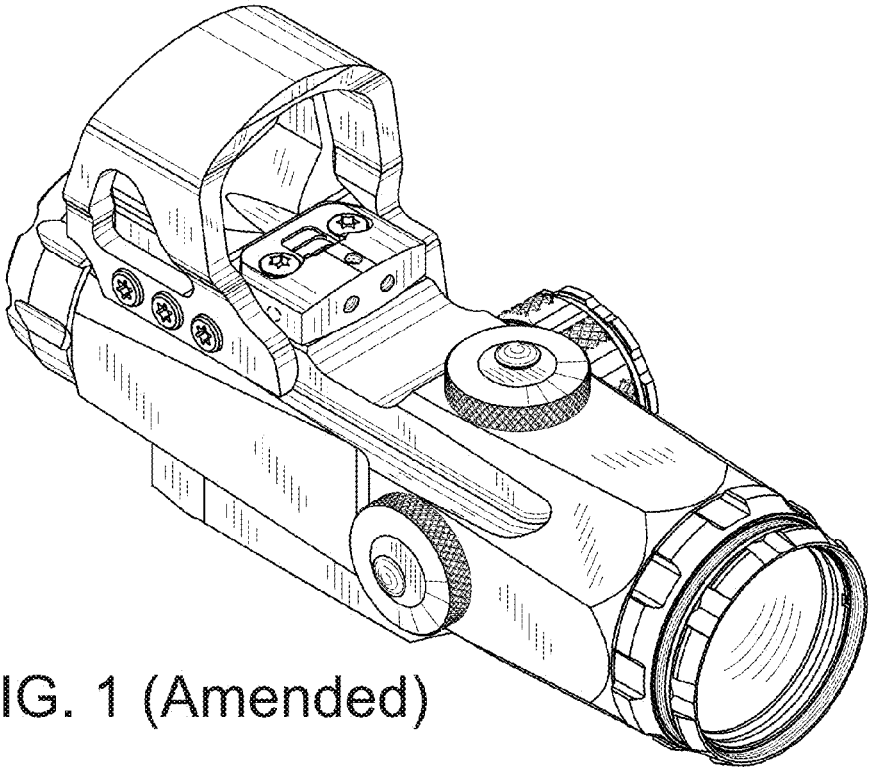
FIG. 1 (Amended)
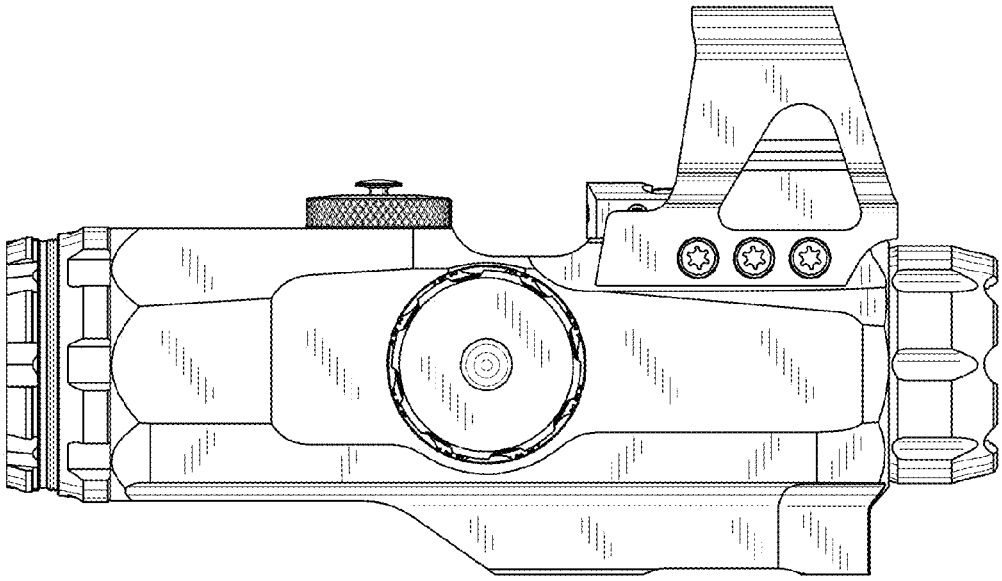
FIG. 2 (Amended)

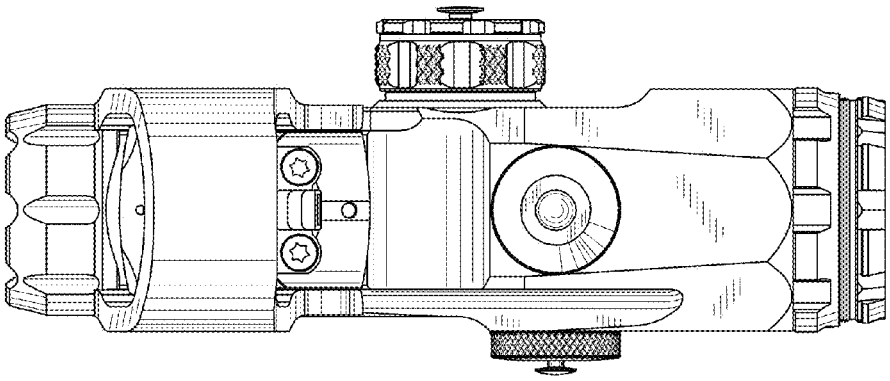
FIG. 3 (Amended)
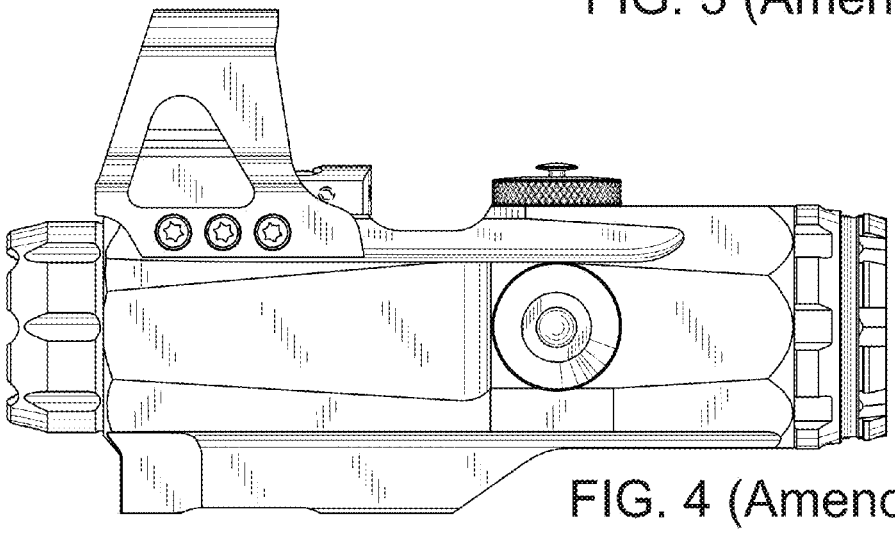
FIG. 4 (Amended)
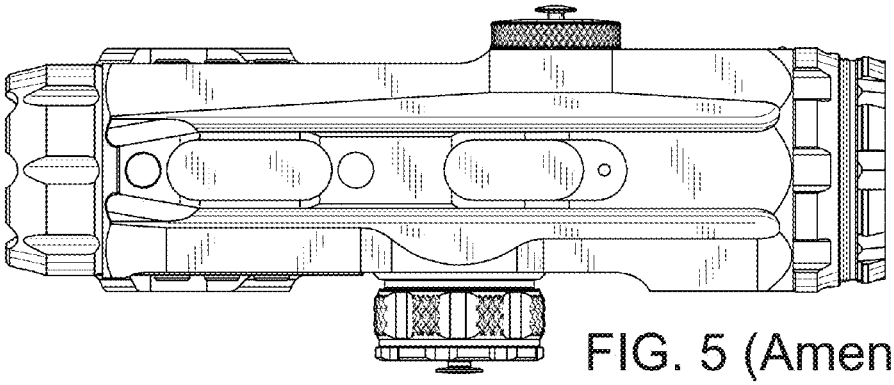
FIG. 5 (Amended)

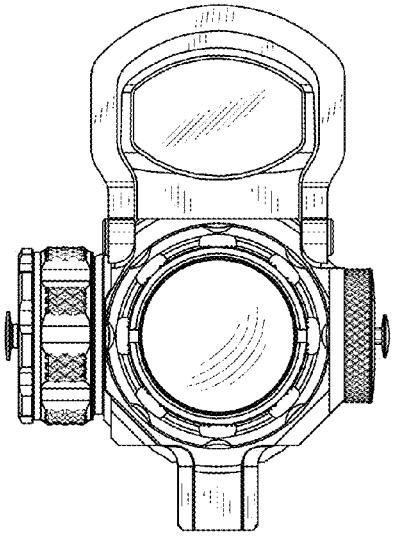
FIG. 6 (Amended)
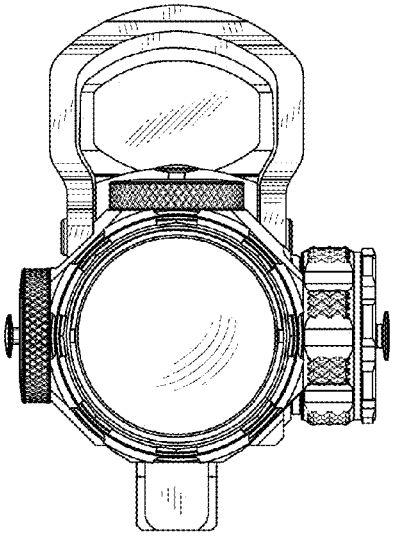
FIG. 7 (Amended)